Dec. 4, 1928.  1,694,081
W. E. REED
ELECTRIC WELDING MACHINE
Filed Aug. 13, 1924   10 Sheets-Sheet 5

INVENTOR
William Edgar Reed
By Kay, Totten & Martin
Attorneys

Dec. 4, 1928.  1,694,081
W. E. REED
ELECTRIC WELDING MACHINE
Filed Aug. 13, 1924    10 Sheets-Sheet 7

INVENTOR
William Edgar Reed
By Kay, Totten & Martin,
Attorneys.

Dec. 4, 1928.

W. E. REED 1,694,081

ELECTRIC WELDING MACHINE

Filed Aug. 13, 1924      10 Sheets-Sheet 8

INVENTOR
William Edgar Reed
Fry, Kay, Totten & Martin,
Attorneys.

Dec. 4, 1928.

W. E. REED 1,694,081

ELECTRIC WELDING MACHINE

Filed Aug. 13, 1924    10 Sheets-Sheet 9

INVENTOR
William Edgar Reed
By Kay, Totten & Martin,
Attorneys

Dec. 4, 1928.

W. E. REED 1,694,081

ELECTRIC WELDING MACHINE

Filed Aug. 13, 1924

INVENTOR
William Edgar Reed
By Kay, Totten & Martin,
Attorneys

Patented Dec. 4, 1928.

1,694,081

UNITED STATES PATENT OFFICE.

WILLIAM EDGAR REED, OF PITTSBURGH, PENNSYLVANIA.

ELECTRIC WELDING MACHINE.

Application filed August 13, 1924. Serial No. 731,831.

My invention relates to electric welding machines, and particularly to machines for welding wire fabric and the like.

The invention constitutes an improvement over the type of apparatus described in my copending application for Letters Patent, Serial No. 683,184, filed December 28, 1923, now Patent No. 1,581,868.

Some of the objects of my invention are, to provide an improved means for controlling the welding current; to provide an improved means for feeding the wires or rods going to make up the completed fabric; to provide an improved means for supporting and holding the wires in position; to provide an improved form of support for the welding electrodes; to provide means for localizing the currents between the co-operating electrodes; to provide means for utilizing the welding current to assist in holding the wires in welding position; to intermittently augment the welding pressures, and to simplify and improve generally the structure and operation of machines of the character referred to.

Some of the forms which my invention may take are shown in the drawings, wherein Figs. 4ª and 4ᵇ show modifications of the devices of Figs. 2 and 4.

Only so much of the apparatus as is necessary to enable my invention to be understood is shown in the drawings, certain of the wire-feeding mechanism and the driving mechanism, as well as a number of welding units being some of the principal parts omitted.

Figure 1:
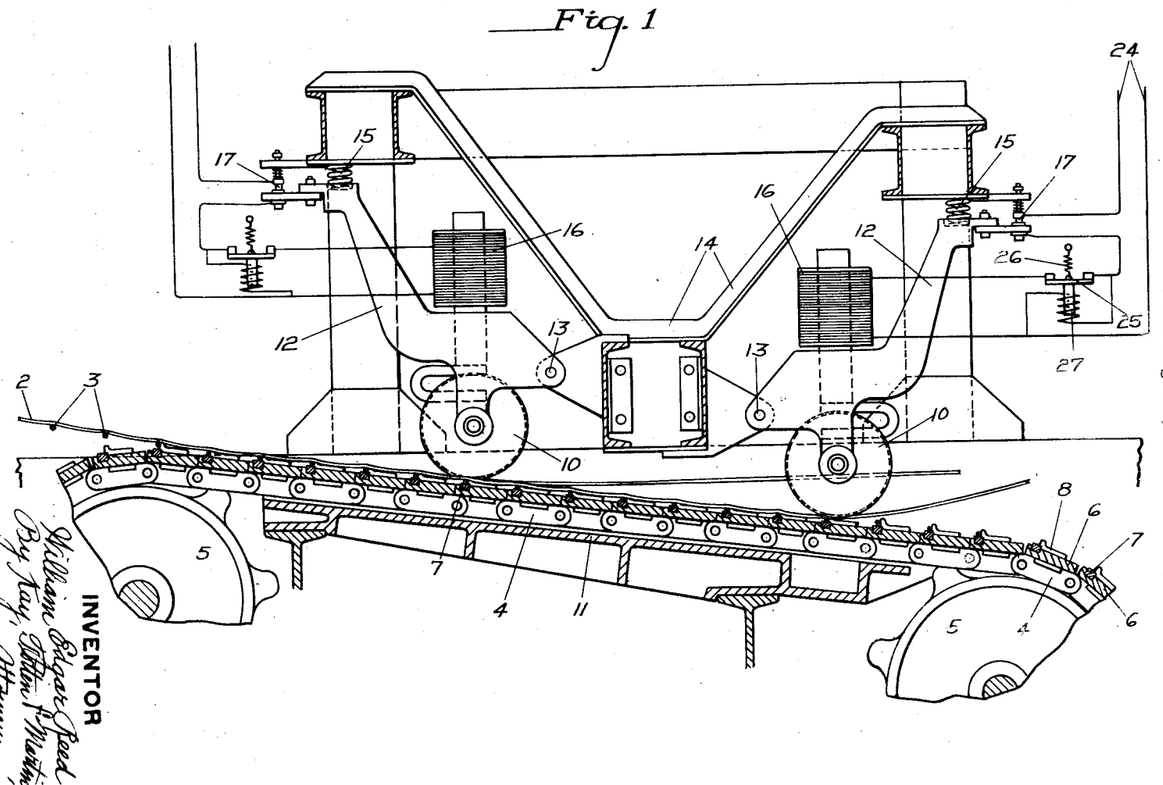
Fig. 1 is a view, partially in section and partially in side elevation, of a portion of a welding machine wherein certain features of my invention are included.

The machine is adapted to weld fabric, which comprises longitudinal or strand wires 2 and transverse or stay wires 3, the wires being fed in from the right hand end of the machine shown in Fig. 1, and the finished fabric being withdrawn from the machine at the left hand end thereof. The fabric is supported and carried forward by a conveyor chain 4 driven by sprocket wheels 5 and carrying anvil bars 6, upon which are mounted welding bars 7, of iron, copper or other suitable conducting material. Guide blocks 8 are secured to the anvils 6, for supporting the stay wires 3 and for drawing the fabric forward as it leaves the rotatable electrodes 10.

The chain 4 and members carried thereby are rigidly supported beneath the electrodes 10 by a table 11. The roller electrodes 10 are supported in rocking frames 12 which are pivotally mounted at 13 to a framework 14. The rocking frames 12 are normally biased downwardly by springs 15, to effect proper welding pressure upon the wires passing beneath the electrodes 10. Each of the frames 12 carries a transformer 16 and a switch 17 for controlling the flow of current through the primary coil 18 (Fig. 3) of the transformer 16.

Figure 3:
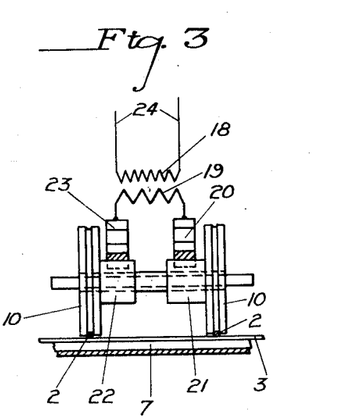
Fig. 3 is a view, in end elevation, of a portion of the apparatus of Figs. 1 and 2, but showing also a diagrammatic arrangement of the primary and secondary turns of the welding transformer.

When the circuit through the primary coil 18 is closed, current is caused to flow in the secondary circuit 19, the path of the current being through the brushes 20, hub 21, of one of the electrodes 10, through the wires 2 and 3 and the welding bar 7 to the other electrode roller 10, its hub 22 and the brush 23.

It is desirable that current shall flow through the primary winding 18 only for the very short period of time that is necessary to complete a weld, and that the circuit be broken automatically and that means be provided for preventing the circuit remaining closed in the event that the machine should be stopped with the electrodes 10 in welding position. In order to accomplish these objects, I provide the switch 17 for controlling the primary circuit 24 of the transformer. In the circuit 24 I provide a switch 25 that is normally held in closed position by a spring 26, and which is controlled by an electro magnet 27 having a coil connected in shunt relation to the circuit 24.

The co-operating contacts of the switch 17 are so positioned that they are in open-circuit relation when the roller electrodes 10 are in their lowermost position, between adjacent stay wires 3, but they are moved into engagement when the rocker arms 12 and rollers 10 are raised slightly upon passage of stay wires 3 therebeneath. Upon closure of the switch 17 current will flow through the circuit 24, thus causing a flow of welding current to be set up in the secondary coil 19. The electro magnet or relay 27 is thereupon energized and moves the switch 25 to open position, against the tension of the spring 26. The time of operation at this relay is adjustable, for adjusting the length of time the welding current is applied. The switch 25 will be held open so long as the switch 17 remains closed. When a stay wire 3 has been advanced from beneath the electrode 10 and the electrode 10 permitted to descend to the position shown in Fig. 2, the switch 17 is opened, de-energizing the circuit 24 and permitting the switch 25 to be closed by the spring 26. Instead of contacts 17 closing the main welding circuit they may close an auxiliary circuit, which in turn closes the main welding circuit, as in the case of switch 32 of Fig. 4. While the primary purpose of the arrangement just described is to limit the period of flow of the welding current, it will be seen that should the chain 4 be stopped while the electrodes are in welding position, or be moved so slowly that it is desirable to interrupt the flow of welding current before the stay wires have passed completely from beneath the roller electrode 10, the relay 27 will automatically open the switch 25, thus cutting off current from the electrodes.

Figure 2:
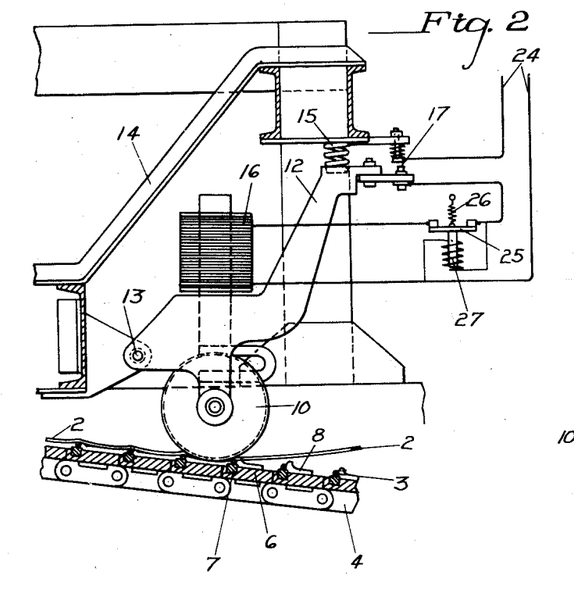
Fig. 2 is an enlarged detail of a portion of the apparatus of Fig. 1.
Figure 4:
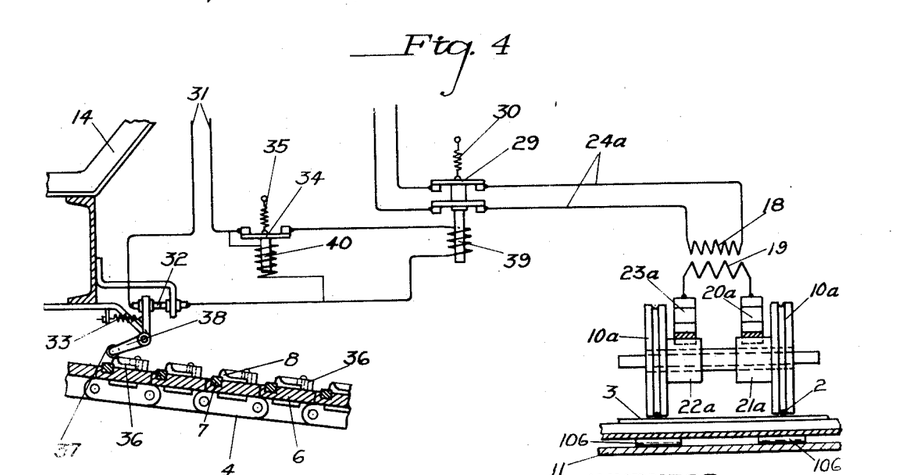
Fig. 4 is a view showing a modified form of switch-closing mechanism and control circuits for the transformer.

In Fig. 4 I have shown a primary circuit $24^a$ and transformer windings 18 and 19. The circuit $24^a$ is provided with a switch 29 normally biased to open position by a spring 30. Instead of controlling the switch 29 directly by vertical movement of the electrodes, I provide a control circuit 31 which has a switch 32 normally biased to open position by a spring 33 and having another switch 34 normally biased to closed position by a spring 35. The circuit 31 is preferably D. C., while the circuit 24 is, of course, A. C. In order to operate the switch 32 in timed relation to the movement of stay wires beneath the roller electrodes, as shown in Figs. 1 and 2, I provide cam blocks 36 which are adjustable longitudinally of the chain 4, to adjust time of application of welding current. The blocks may also be of varied length, to vary the length of time that welding current is applied. The roller 37 of a bell crank 38 co-operates with the cam block 36 to close the switch 32 against the tension of the spring 33 at the instant that a stay wire passes beneath the roller electrodes $10^a$ which are at that time electrically associated with the circuit $24^a$.

When it is desired to omit any welds or series of welds of either longitudinal or cross wires, certain of the lugs that close the primary circuit of the welding transformer may be removed from the table or displaced, or the cam may be displaced, so that it will not touch the lug as the table moves along, or the circuit 31 may be opened by a switch, or certain cross or longitudinal wires need not be fed into the machine.

The circuit 31 is provided for the purpose of energizing the electromagnet 39 which closes the switch 29 against the tension of the spring 30 or gravity and completes the welding circuit $24^a$. In order that the welding circuit will not be maintained closed for an excessive period of time, I provide a time limiting relay 40 connected in shunt relation with the circuit 31, or any other known relay, for opening said switch after current has been flowing through the circuit 31 for a predetermined period of time. The switch 29, controlled by magnet 39, may be made to make and break the welding current by the continuous movement past adjustable contacts that vary the length of time the welding current flows, and thus eliminate the time relay. For instance, the stationary contacts can be provided with wide faces across which the movable contact slides in operation.

By providing a D. C. control circuit and operating magnet for the switch 29, a quicker action of said switch is effected than if the control circuit were A. C. Furthermore, the control circuit may be of relatively low voltage.

In Fig. 4$^a$ is shown a modification of the control circuits of Figs. 2 and 4. In this figure the welding current for the transformer windings 18$^c$ and 19$^c$ is supplied through a circuit 24$^c$. The circuit 24$^c$ is primarily controlled by movement of blocks 36 into engagement with the rocker arm 38 that actuates the switch 17$^c$ to control the circuit 24$^c$. These blocks are adjusted for time of application and duration of flow of the welding current. A D. C. auxiliary circuit, an A. C. series relay and a D. C. contactor are provided to control circuit 31$^c$ and for limiting the period of time that current may flow through the welding circuit 24, independent of the cam blocks and may operate before the circuit is opened by the cam blocks.

A magnet 40$^c$ is in series with the circuit 24$^c$, and when the switch 17$^c$ is closed the coil of 40$^c$ is energized to close the switch 34$^c$ to complete the control circuit 31$^c$. Thereupon the coil 39$^c$, in series with the switch 34$^c$ and the D. C. circuit is energized and moves the switch 29$^c$ to open position, thus breaking the welding circuit 24$^c$. The welding current is thus utilized to control the D. C. circuit which in turn controls the A. C. or welding circuit. The D. C. or control circuit may be of low voltage. I provide an auxiliary holding coil 40$^x$ that is connected across the line 24$^c$ and which is of such resistance and number of turns as to merely hold the switch 34$^c$ closed, so that the circuit 31$^c$ will be maintained, to hold the switch 29$^c$ open. When the switch 17$^c$ is again opened, the line 24$^c$ will be de-energized and the switches 34$^c$ and 29$^c$ be permitted to return to their normal positions as shown on the drawings.

Instead of employing a D. C. auxiliary control circuit such as 31$^c$ of Fig. 4$^a$, I may provide such auxiliary circuit in the form of a shunt circuit 31$^d$ connected across the welding circuit 24$^d$, as shown in Fig. 4$^b$. A coil 40$^d$ is provided in series with the circuit 24$^d$ for actuating a switch 34$^d$ to close the same upon energization of the circuit 24$^d$. A portion of the current will thereupon flow through the circuit 31$^d$, energizing an A. C. time limit and overload relay and contactor 39$^d$ to open a switch 29$^d$ and break the welding circuit 24$^d$, and therefore interrupt the flow of current through the transformer coils 18$^d$ and 19$^d$. The switch 29$^d$ will be held open so long as the switch 17$^d$ is closed. Upon movement of the welding bars 7 to open the switch 17$^d$, the switch 29$^d$ will thereupon be closed by a spring or gravity. Upon further movement of the welding bars 7 the switch 17$^d$ will be closed and the cycle of operation just described completed. Various other connections may be used and switch 32 may be connected in the contactor coil circuit.

The coil 34$^c$ has only a few turns and will not operate until welding current is on the line 24$^c$, thus providing an adjustable time interval between the closing of the switch 17$^c$ and the opening of the switch 29$^c$.

Figures 5, 6, 7:
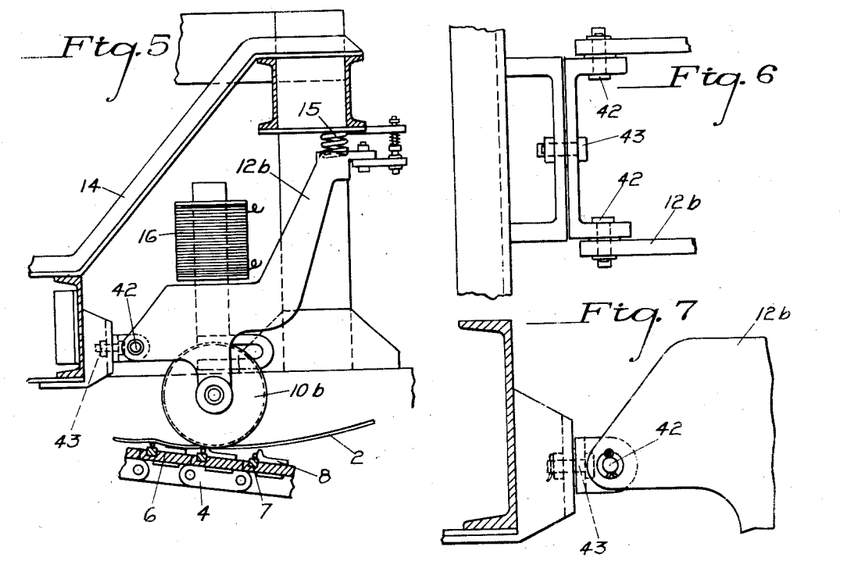
Fig. 5 is a view similar to that of Fig. 1, but showing an improved form of mounting for the roller electrodes.
Fig. 6 is a plan view of a portion of the apparatus of Fig. 5.
Fig. 7 is a view of the portion of the apparatus of Fig. 5, on an enlarged scale.

Referring now to Figs. 5 to 7, I show an improved mounting for the rocking frames 12$^b$ which support the roller electrode 10$^b$. While the rocking frames 12 of Fig. 1 are mounted for pivotal movement in but one plane, and may have only a slight movement in a plane disposed transversely of the path of travel of the chain, the rocking frames 12$^b$ of Figs. 5 to 7 are mounted for pivotal movement both in a plane parallel to the path of travel of the chain 4 and in a plane transverse thereto. I accomplish this by providing transversely disposed pivots 42 which permit oscillation of the frame 12$^b$ in a vertical plane parallel to the path of travel of the chain, and a pivot or swivel 43 which permits the frame 12$^b$ to rock in a plane disposed transversely of the chain or carrier 4. This permits the rollers 10$^b$ to freely adjust themselves to larger irregularities in the thickness of the wires, accommodate themselves to uneven wear of certain parts, etc., so that each roller will always make effective engagement under pressure with the wires therebeneath. Instead of the double pivot mounting 42—43, some other universal movement as a ball and socket structure may be provided.

Figure 8:
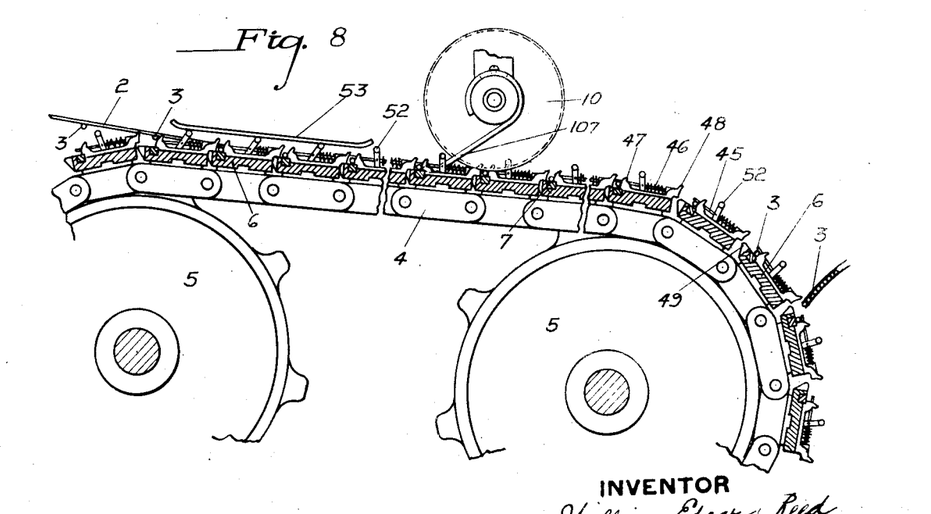
Fig. 8 is a view, partially in side elevation and partially in section, of means for supporting and locking the stay wires in position upon the carrier.
Figures 9, 10, 11, 12, 13, 14:
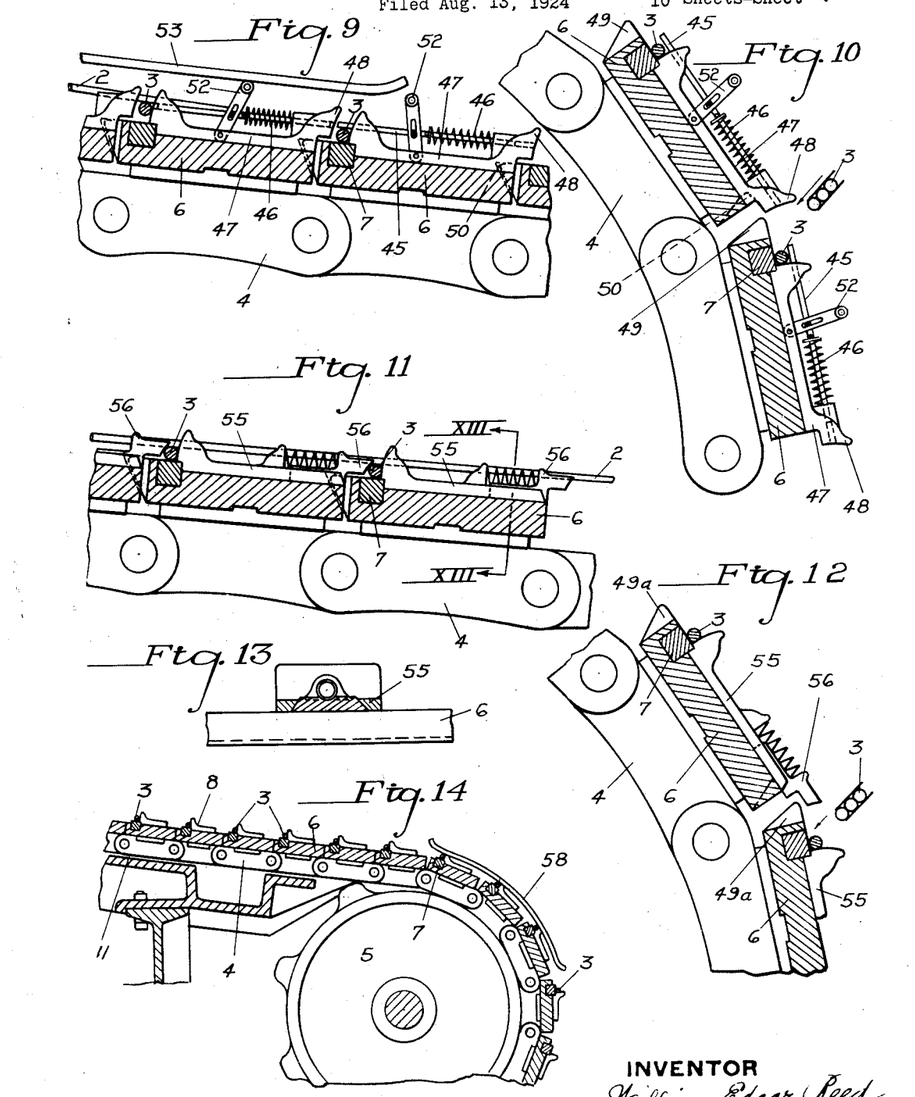
Figs. 9 and 10 are views of portions of the apparatus of Fig. 8, on an enlarged scale.
Figs. 11 and 12 show modifications of the holding devices of Figs. 8 to 10.
Fig. 13 is a view taken on the line 13—13 of Fig. 11.
Fig. 14 shows a modified form of the stay wire holding device.

Referring to Figs. 8 to 10 inclusive, I have shown an improved manner of feeding and supporting the wires which are to be welded. In the form of construction shown in Fig. 1, as well as in my application above referred to, the stay wires are deposited upon the bars 7 after the chain starts on its upper horizontal flight. In order to permit the stay wires to be so fed, the strand wires 2 must be fed at an angle, as shown in Fig. 1, and suitable guide means (not shown) provided therefor. By the arrangement shown in Figs. 8 to 10, the strand wires may be fed on a line parallel to the upper chain flight, thus avoiding bending, and rendering special guiding devices unnecessary. To accomplish this object, I provide means whereby the stay wires may be fed at a point below the upper line of travel of the chain 4. This necessitates the provision of holding devices for the stay wires. Such holding devices are shown more clearly in Figs. 9 and 10, and comprise locking rods 45, which are normally pressed forwardly by springs 46 so that when stay wires 3 are fed thereto, as shown in Fig. 10, such wires will be securely held in position upon the welding bars 7. The locking rods 45 are supported in brackets 47 that are secured to the anvil bars 6 and are provided with overhanging portions 48, which, as shown in Fig. 10, bridge the gap between adjacent bars 6 when the chain 4 is passing around the sprocket, thus preventing the wires 3 from being accidentally deposited between opposing edges of the bars 6. The forward edge of each bar 6 may be provided with a plurality of nose portions 49 that fit in recesses 50 of an adjacent bar, to supplement the overhanging guards 48 and assist in preventing stay wires from falling between the adjacent edges of the bars 6.

When a bar 6 is advanced from the position shown in Fig. 10 to that shown in Fig. 9, the overhanging portions 48 serve to assist in retaining the said wires 3 in position. It will be understood that each bar 6 is provided with a plurality of brackets 47, disposed longitudinally of the bar, i. e., transversely of the carrier 4.

Fig. 9 represents a portion of the conveyor 4, adjacent to the left hand or discharge end thereof, and shows means for disengaging the stay wires 3 from the holding members. Each block or bracket 47 supports a pivoted lever 52 which has a pin-and-slot connection with the locking rod 45, so that when the lever 52 is moved in a clockwise direction, the rod 45 will be retracted against compression of the spring 46, freeing the stay wires 3 for withdrawal vertically from their seats on the welding bars 7. In order to effect this withdrawal automatically I provide, at a point adjacent to the left hand end of the conveyor 4, a guide rail 53 with which the upper ends of the levers 52 contact and by which they are forced backwardly during forward travel of the chain, to permit ready withdrawal of the fabric as indicated at the left hand end of Fig. 8.

Referring now to Figs. 11 and 12, I have shown a modification of the holding devices of Figs. 8 to 10. Upon the blocks 55 which are carried by the anvils 6, I mount spring-pressed slides 56 that normally project over the nose portion 49ª of the next succeeding bar 6, to prevent stay wires being fed between adjacent edges of the bars 6. These slides 56, when the chain 4 reaches the position shown in Fig. 11, engage the stay wires 3, to hold them firmly in welding position upon their seats. It will be apparent that when the chain 4 reaches the left hand end of the machine, the flexure thereof will cause disengagement of the slide 56 from the wire 3 and permit withdrawal of the mesh as shown in Fig. 8.

Referring now to Fig. 14, I show a structure wherein the locking bars and slots of Figs. 8 to 13, inclusive, may be omitted for certain classes of work. In this form of construction a guide plate 58 engages the stay wires 3 immediately after they are fed to the conveyor and maintains them in position while traveling around the breast of the wheel and until reaching a position on the roller, where they will be maintained in place by gravity and by the strand wires (not shown) which are being fed to the machine.

When welding, the desired path for the secondary welding current is from one transformer terminal through one rolling electrode, across one longitudinal wire to the cross wire where the weld is made, then along the welding bar and through the cross wire again and another longitudinal wire where a weld is made and then back through the other rolling electrode to the other terminal of the transformer. Some of the current may pass along the cross wire in a parallel path to the welding bar between the two rolling electrodes without entering the welding bar, and some may pass through the welding table if the welding bar is not insulated from it or the wires are in metallic contact with the table. Any current, whatever its path, however, is effective in making a weld, provided it passes between the cross and longitudinal wires at the point where the weld is to be made. The path between the rolling electrodes should be low in resistance and inductance except at the points where welds are to be made.

There are some leakage or stray paths which some of the welding current may follow, particularly when making some mesh products and small mesh fencing, etc., instead of passing through the points to be welded, so that these currents and the energy represented therein are not effective in producing a weld, and diminish and vary the strength of the welding current. For example, the preceding weld offers a stray path from one horizontal wire through the preceding weld and preceding cross wire and then back to the other electrode without passing through the points to be welded. The same is true to some extent with the wires to be welded following, although this leakage current must pass through pressure contacts rather than welded contacts and therefore may not be so important. If the cross or longitudinal wires are in metallic contact with metal guides or with the table, other stray paths are formed that reduce the effectiveness of the welding current by short circuiting the points to be welded.

Figures 15, 16, 17, 18:
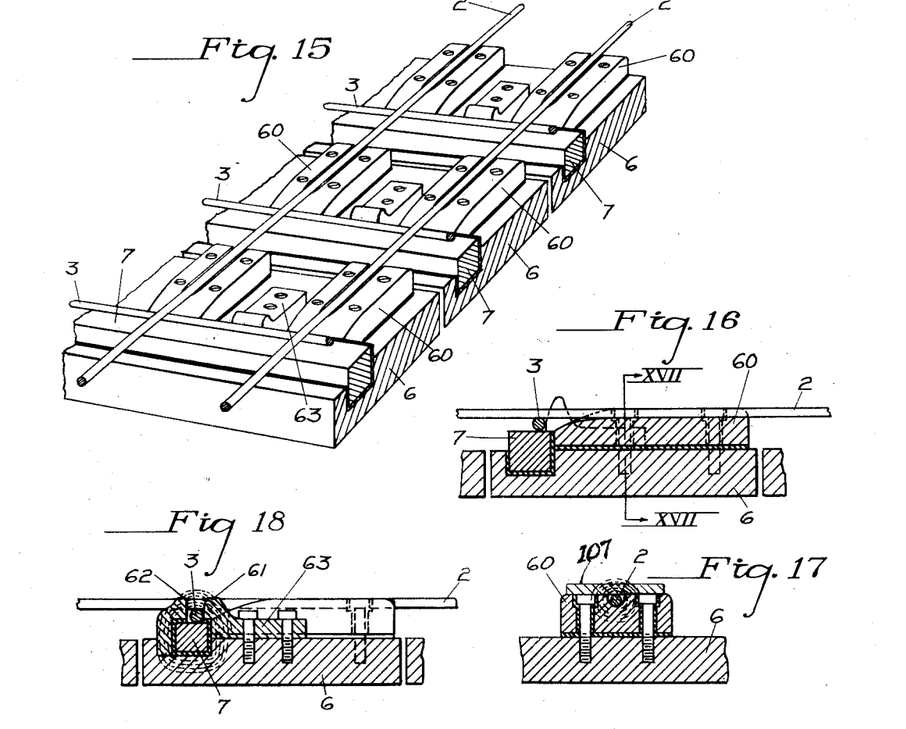
Fig. 15 is a view, in perspective, of an improved arrangement of strand wire guide blocks and welding bars.
Fig. 16 is a longitudinal sectional view of a portion of the apparatus of Fig. 15.
Fig. 17 is a view taken on the line 17—17 of Fig. 16.
Fig. 18 shows a modification of the device of Fig. 16, taken on the line 18—18 of Fig. 19.

In order to reduce stray currents and short circuits, as well as to utilize magnetic effects produced thereby, I provide the arrangements shown in Figs. 15 to 20, inclusive. In Fig. 15 the welding bars 7 are supported by anvil bars 6 but insulated therefrom by any suitable insulating material. The bars 6 are preferably of steel and the bars 7 of copper. Metallic guide blocks 60 of magnetizable material are secured to but insulated from the anvil bars 6. These blocks serve as guideways for the longitudinal or strand wires 2. The strand wires 2 lie within grooves formed in the blocks 60 which serve as magnets to create a magnetic field about the strand wires 2, as shown in Fig. 17, when current tends to flow through them. This magnetic field resists flow of current longitudinally of the wires 2. This flow is undesirable, for the reasons above pointed out, for it will thus be seen that what would otherwise be a stray current and wasted, is utilized to create inductive resistance to its own flow.

In Figs. 8 and 17, I show a drag plate 107 of magnetizable material pivotally supported to the rocker arm 12 and adapted to bridge the side walls of the recessed block 60, in the manner shown in Fig. 17, to complete a magnetic path for the flux. As each block reaches the drag plate, welding current will be passing through the wires so that the plate will always be in position to act as a flux conducting member for the magnetic field shown in Fig. 17.

In the form shown in Figs. 15 and 16, no provision is made for retarding flow of current in the stay wires 3, but in Fig. 18, lugs 61 and 62 are provided at opposite sides of the stay wire 3, the lug 61 constituting, if desired, an extension of seating block 63. These lugs 61 and 62 constitute a portion of the path of a magnetic field around the stay wires 3 in a manner similar to the walls of the grooved block 60 and retard the flow of current along the wire 3. It is generally desirable to omit these magnetic fields between each of the two roller electrodes constituting a pair, in order to permit free flow of current therebetween, but, where used, the magnetizable members, if disposed at opposite sides of each pair of electrodes, will tend to prevent stray currents flowing therepast along the stay wires 3.

The magnetic effects shown in Figs. 17 and 18 may also be utilized to attract and hold the wires in position upon their seats.

Figures 19, 20:
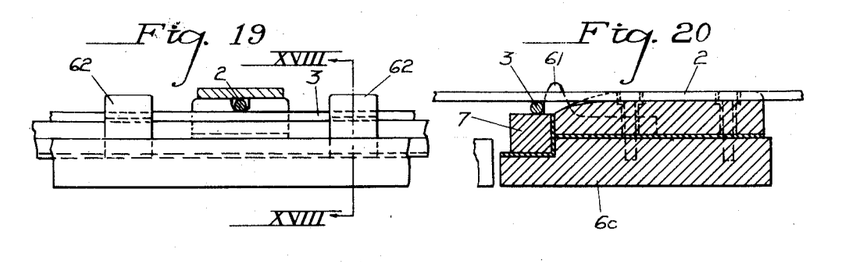
Fig. 19 is a view, in end elevation, of the apparatus of Fig. 18.
Fig. 20 is a further modification of the device of Fig. 16.

As to Fig. 20, the magnetic reluctance is increased and opposition to current flowing along the welding bars 7 and stay wires 3 is reduced to a minimum by elimination of the front wall from the recess in the bar 6ᶜ, by making blocks 60 and 61 of non-magnetic material, so that there is no magnetizable material seated against or adjacent to the front wall of the bar 7, as in Fig. 16, for example. This form of construction with no magnetic material in close proximity to the cross wire is desirable where a minimum resistance to the flow of current between adjacent roller electrodes is desired.

Figure 21:
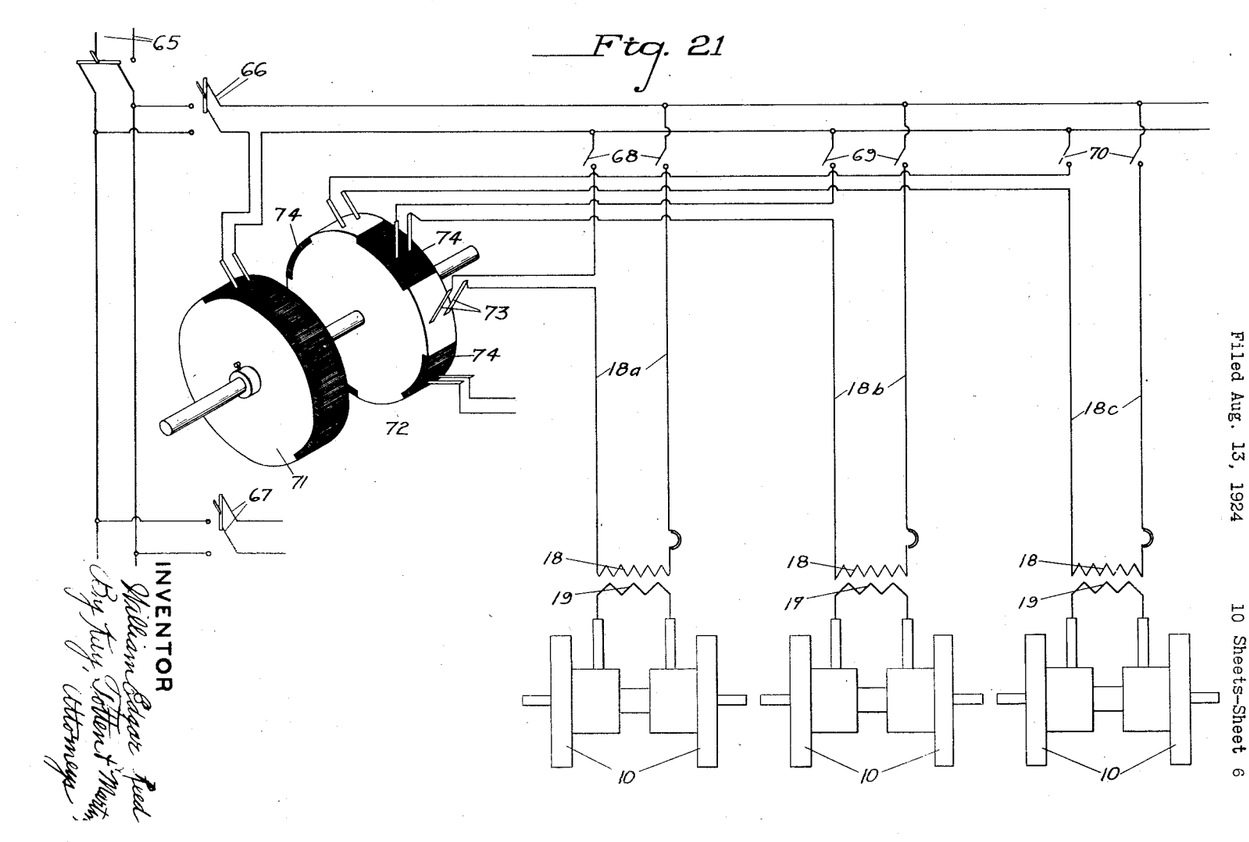
Fig. 21 is a schematic view showing one manner in which the respective welding circuits may be controlled.

Fig. 21 shows a schematic arrangement whereby the circuits of the various transformers may be controlled so that certain welds may be omitted in some classes of work. Current is supplied to the primaries of the various transformers through circuits 18ᵃ, 18ᵇ, 18ᶜ, etc. These circuits are supplied from a main circuit 65 and may be controlled in groups by hand switches 66, 67 or the like, or individually by hand switches 68, 69 and 70, or individually and automatically by commutators 71 and 72.

Referring to the circuit 18ᵃ, for example, it will be seen that if the switch 68 be closed, the circuit therethrough will be completed, through brushes 73 and commutators 72, to effect a welding operation when wires are passed beneath the electrodes 10. The commutator is provided with insulation 74 at predetermined points on its periphery, so that the circuit 18ᵃ will be broken at predetermined intervals to omit welding the stay wires to the strand wires at certain points. The commutators 71 and 72 are driven through connections (not shown) in definite relation to the movement of the carrier for the wires. The circuits 18ᵇ and 18ᶜ may be similarly controlled, while the bank of electrodes represented in the circuits 18ᵃ, 18ᵇ and 18ᶜ may be controlled as a unit by the commutator 71, to simultaneously omit a series of welds.

Figure 22:
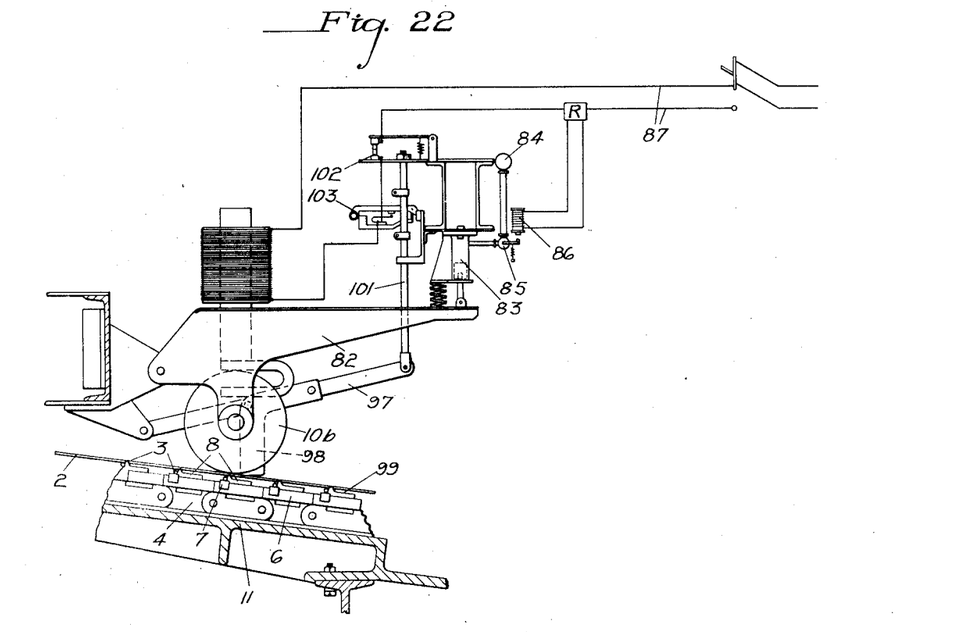
Fig. 22 is a view showing mechanism for applying increased pressure to the electrodes.
Figure 23:
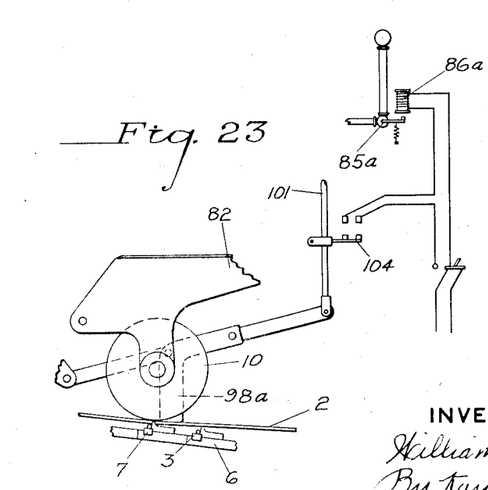
Fig. 23 is a modification of the apparatus of Fig. 22.

For heavy wires, a greater pressure than that resulting from the weight of the rocker arm 12 and spring 15 of Fig. 1 is required, and to secure such additional pressure I provide fluid pressure means such as shown in Figs. 22 and 23. In Fig. 22, the rocker arm 82 is pivotally supported and carries the roller electrodes 10ᵇ in a manner similar to the arm 12 of Fig. 1. However, above the outer end of the arm 82 I provide a cylinder 83, in which a piston is operated by fluid pressure from a source 84, the supply being controlled by a valve 85 which is normally spring-held in closed position. A magnet 86 controls the valve 85 and serves to open it against the pressure of its spring when the magnet is energized upon closing of the welding circuit 87. The welding circuit 87 may be closed through the medium of a bell crank 98 that is intermittently engaged by guide blocks 99 to raise the switch-operating rod 101, that actuates switches 102 and 103 for controlling the circuit 87 of the primary winding of the transformer, in a manner similar to that described at length in my copending application above referred to.

When the circuit 87 is closed to effect a welding operation, the magnet 86 will thereupon be energized and the valve 85 opened, thus admitting fluid under pressure to the cylinder 83, and forcing the outer end of the arm 82 downwardly, thus increasing pressure at the welding point.

The rod 101 remains in elevated position only momentarily, and as it descends the switches 102 and 103 are opened, thus breaking the circuit 87 and de-energizing the coil 86, thereby permitting the valve 85 to be closed by its spring and cut off the supply of pressure fluid.

In Fig. 23 I have shown a modification of the apparatus of Fig. 22. In this figure the transformer circuit is the same as in Fig. 22, but the circuit for actuating the magnet 86ª is independent of the welding circuit and is controlled directly by the elevation of the rod 101, by means of a vertically adjusted switch 104. The additional pressure through the valve 85ª may thus be timed without regard to the closing of the welding circuit, thus the additional pressure may be applied either in anticipation of or directly after the closing of the welding circuit. It may be desired to open the valve in advance of the closure of the welding circuit, to permit accumulation of pressure in the cylinder previous to closure of the welding circuit, so that a welding blow will be delivered in proper relation to the heating of the wires.

Welding current can be supplied from the same source as that employed to drive the motor which operates the table, in which case such current will be automatically cut off upon cutting off of the supply to the motor.

Both heat and pressure are required to produce said welds. Pressure, if any, at the time of application of the welding current to heat the wires, must be very light, or sufficient resistance will not be provided to the flow of the current. It is therefore advisable to complete the welding circuit immediately before the application of pressure, which application may occur both by movement of the stay wire and its seating blocks into position beneath the roller electrodes, producing a hammer blow effect and by the application of fluid pressure and the like to supplement the weight of the rocker arm 12 and the spring mounted at the upper end thereof. The weight of the arm 12 may be varied as by weights adjustably mounted thereon.

The piston in Fig. 22 is returned to retracted position by elevation of the outer end of the arm 82 and the valve 85 may be provided with a bleed port to permit exhaust from the cylinder 83 during retraction of the piston. The magnetizable members of Figs. 15 to 20 may be supplied with current from a source extraneous to the welding current, and may be provided with magnetic coils, if desired.

In Fig. 4 I have shown anti-friction rollers 106 which may be disposed below the anvil bars 6 at points where they pass beneath the roller electrodes. These rollers serve to relieve the friction at points where welding pressure is applied.

Figures 4A, 24:
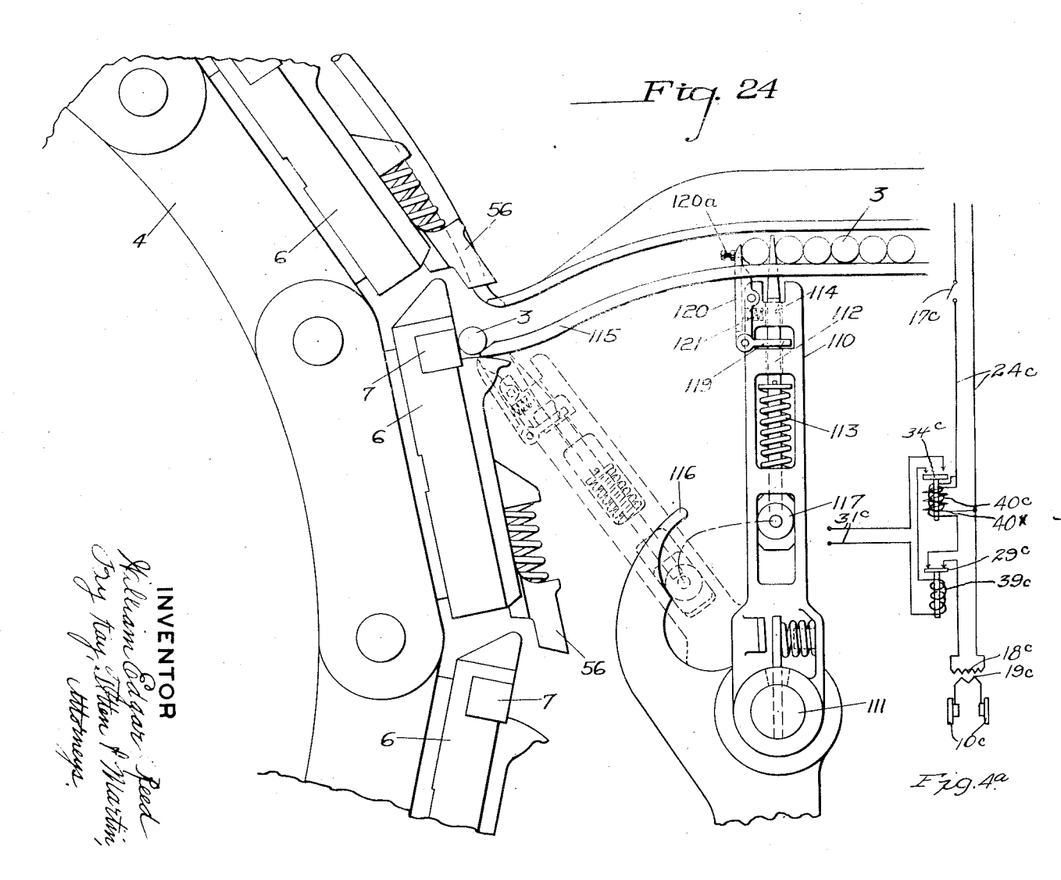
Fig. 24 is a view, on an enlarged scale, showing an improved form of feeding device.
Figure 4B:
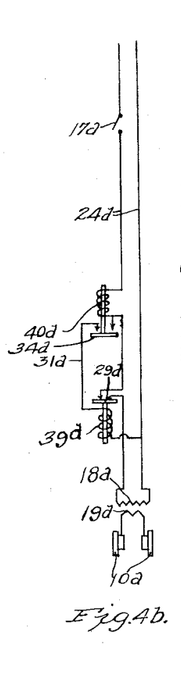

In Fig. 24 I have shown an improved form of feeding apparatus whereby the stay wires are fed one by one, in timed relation to the movement of the conveyor 4, so that a wire is delivered each time to the conveyor at the instant that certain of the bars 6 reaches receiving position, as shown in the drawing.

The device comprises a rocker arm 110 that is oscillated in timed relation to the movement of the conveyor. The rocker arm is pivotally supported at 111 and is provided with a longitudinaly movable plunger 112, that is normally pressed upward by a spring 113, and is provided with a latching recess 114. The arm 110 is shown in wire-receiving position. From this position it is moved forward by mechanism, not shown, to the position indicated in dotted lines. The stay wire is guided out of engagement with the arm, by means of a curved plate 115, into its seat upon the anvil bar 6. During this forward movement a cam 116 engages a roller 117 carried by the plunger 112, drawing it down against the compression of the spring 113 and causing it to be engaged by a latch 119 that locks it in retracted position.

The latch 119 is pivotally connected to the lower end of a pivoted lever 120 that is normally biased in a clockwise direction by a spring 121. There are a plurality of rocker arms provided for engaging the wires 3 at different points longitudinaly of the wires. These arms may be arranged in two or more sets, so that one set may be advancing a stay wire while another set is picking up a wire to be advanced, to effect a more rapid feed.

Upon return movement of the rocker arm 110 with the plunger 112 locked in retracted position, as described, the pivoted lever 120 is engaged by the leading stay wire 3, causing it to be rocked in a counter clockwise direction and to disengage the latch 119 from the plunger 112, and permitting the plunger to be forced upwardly to the position shown in the drawing. The arm 110 is then ready to feed another wire to the machine.

The wires 3 may be advanced in timed relation to the movement of the rocker arm 110 and the conveyor 4, or may be fed against a yielding stop (not shown) mounted adjacent to the retracted position of the rocker arm 110, so that a stay wire will always be in position to be picked off by the plunger 112 and the lever 120. The lever 120 acts as a feeler and is provided with an adjustable stopscrew 120ª, to permit adjustment to wires of various thickness. This adjustment may be obtained in other ways, as by changing the latch 119, or by making the arm jointed, etc., to insure the applicability of the device to wires of different thickness.

The carriers composed of the arms 110 and the members 112 and 120 will all effectively engage each wire to carry it forward in substantial parallelism with the welding bars, regardless of irregularities in the wire or misalignment thereof when being picked up.

Figure 25:
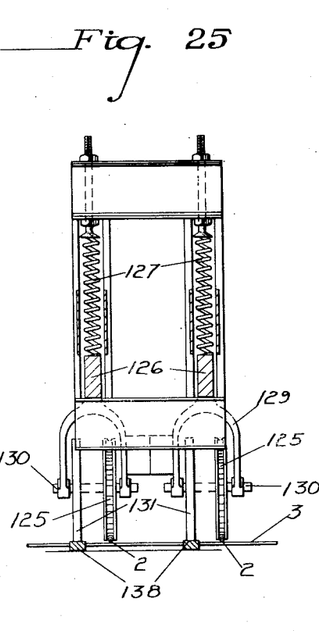
Fig. 25 is a view showing one manner in which welds may be effected through roller electrodes mounted singly instead of in pairs.
Figure 26:
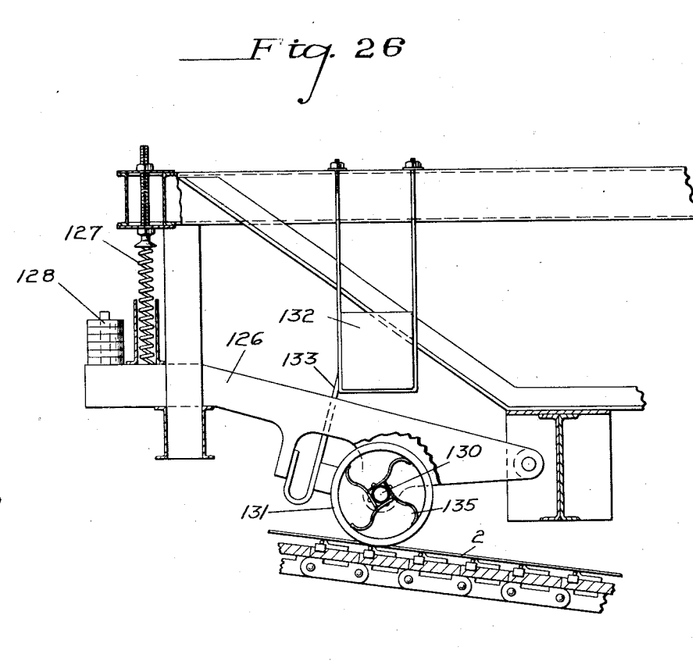
Fig. 26 is a view, partially in side elevation and partially in section, of the apparatus of Fig. 25.

Referring now to Figs. 25 and 26, I show a manner in which single welds or an odd number of welds may be readily made, as referred to in my said application for patent, the roller electrodes 125, instead of being mounted in pairs as in the device of Figs. 1 to 4, are each independently mounted upon a rocker arm 126 that is normally pressed downwardly by a spring 127 and weights 128, to make more effective contact and supply welding pressure.

Figure 32:
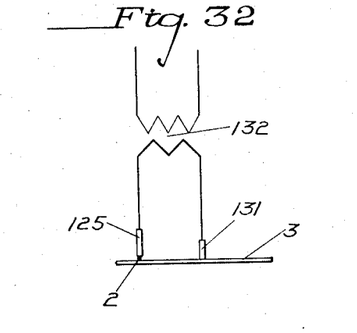
Fig. 32 is a view showing a manner in which the electrodes and contact rollers of Figs. 25 and 27 may be connected to the transformer.

Each of the arms 126 has a yoke portion 129 in which is journaled a shaft 130. The roller electrode 125 is carried by the shaft 130 and also a contact roller 131, both insulated by insulating bushing from the shaft 130, as indicated in Fig. 26. The electrodes 125 and the roller 131 may be connected to a transformer 132 in the manner shown in Fig. 32. In this arrangement the contact roller 131 acts as an idler and serves merely to complete the circuit through the secondary coil of the transformer and the roller electrodes. The rollers 125 and 131 are each connected to the transformer 132 through a flexible conductor 133.

By the arrangement just described, the pressure on each electrode may be independently adjusted and uniform welding therefore obtained. Where the electrodes are mounted in pairs and movable as a unit, it is more difficult to adjust for equal pressure on two welds, particularly as when there is non-uniformity in the thickness of the material beneath the respective electrodes of a pair at a given time.

In order that no more than the necessary pressure shall be applied through the contact rollers 131, I may mount such roller loosely upon the axle 130 and hold it centralized thereon by means of springs 135 instead of the usual rigid sprockets.

Figure 27:
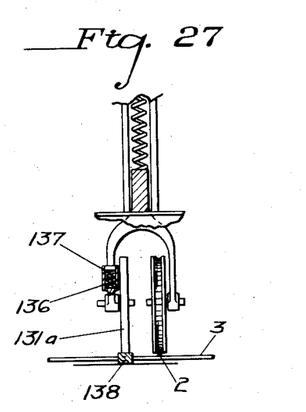
Fig. 27 is a modification of the device of Fig. 25.

In Fig. 27 still another manner of yieldingly mounting the contact roller 131ª is shown. In this form of device the contact roller and the roller electrode are mounted on independent shafts and the shaft for the roller electrodes is supported by a telescopic hanger member 136 normally pressed downwardly by a spring 137 which is under tension nearly sufficient to insure proper electrical contact between the roller 131ª and a contacting bar 138 which is disposed longitudinally of the welding table, and may have cutout portions to accommodate the stay wires 3, so that a substantially smooth path will be provided for the members 131 and 131ª.

Figure 28:
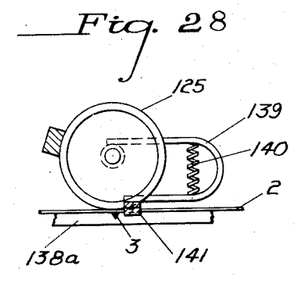
Fig. 28 is a view showing a modified form of contactor for cooperating with the roller electrodes to complete the circuit.

In Fig. 28 I show a yielding contact member 139 which may be employed in lieu of the roller contacts 131, for completing the circuit through the roller electrodes 125. The member 139 is of flexible conducting material, the arms of which are normally biased apart by springs 140 to effect engagement between the brush member 141 and the conductor bar 138ª carried by the table.

Figure 29:
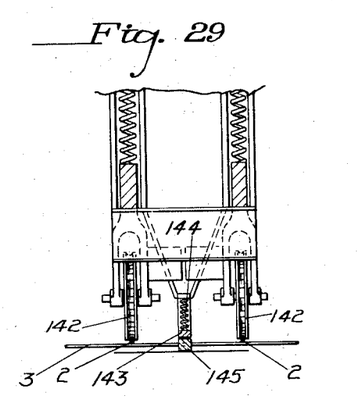
Fig. 29 is a view showing roller electrodes mounted similarly to those of Fig. 26, but having a common return conductor.
Figure 30:
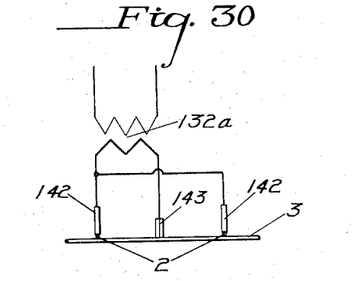
Figs. 30 and 31 are diagrammatic views showing two ways in which the electrical connections for the electrodes and return conductor of Fig. 29 may be arranged.

In Fig. 29 I have shown a pair of roller electrodes 142 mounted similarly to the electrodes 125, and also capable of independent pressure adjustment, but having a common return conductor 143 in lieu of the roller conductors 131 of Fig. 25. This return conductor consists of a brush 143, normally biased downwardly by a spring 144, and engaging the conductor bar 145 on the welding table. The brush may be connected to the transformer 132ª through flexible connectors (not shown). The roller electrodes 142 are connected in parallel, as shown in Fig. 30. By employing a single transformer for a plurality of electrodes, it is possible to secure closer spacing of the strand wires.

Figure 31:
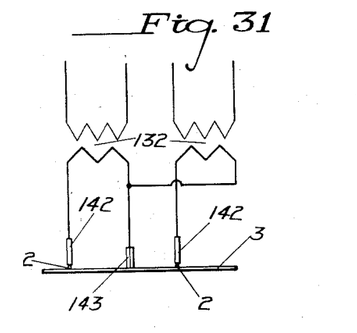

Still another manner of connecting the roller electrodes 142 and the common return conductor 143, as shown in Fig. 31, wherein the common return may be employed even though a transformer is provided for each electrode.

I claim as my invention:

1. Electric welding apparatus comprising a rotatable electrode, a rectilinearly movable electrode cooperating therewith, means for permitting movements of one of said electrodes toward and away from the other electrode, a welding circuit, and means actuated by the last named movement of said one electrode for closing said circuit.

2. Electric welding apparatus comprising cooperating electrodes one of which is movable with respect to the other, a welding circuit, a switch in said circuit closed and opened by successive movements of said movable electrode, and a time element device adapted to be energized upon closure of the welding circuit for interrupting said welding circuit, the said device being de-energized upon the opening of the said switch.

3. Electric welding apparatus comprising relatively movable electrodes, a welding circuit, means actuated by successive movements of one of said electrodes relatively to the other, for closing and opening said circuit, and means energized upon closure of said circuit for interrupting the same, the last named means being de-energized upon opening of the welding circuit.

4. Welding apparatus comprising a movable electrode, a pair of laterally spaced cooperating electrodes, and means for supporting said electrodes for movement about an axis parallel to the line of movement of said first-named electrode.

5. Welding apparatus comprising a movable electrode, a pair of laterally spaced cooperating electrodes, and means for supporting said electrodes for movement about an axis parallel to the line of movement of said first named electrode, and about an axis transverse to said line of movement.

6. Electric welding apparatus comprising a conveyor for bars to be welded, means for supplying welding current to said bars, and means for limiting the flow of stray currents past predetermined points on said bars.

7. Electric welding apparatus comprising a conveyor for bars to be welded, means for supplying welding current to said bars, and means for limiting the flow of stray currents past predetermined points on said bars, said means comprising magnetizable members disposed at opposite sides of the bars in position to form a magnetic field around said bars through induction, and an electrical circuit around said bars.

8. Electric welding apparatus comprising a conveyor for supporting bars to be welded, means for supplying a welding current to said bars, and means for utilizing a portion of said current to assist in holding the bars in position upon said conveyor.

9. Electric welding apparatus comprising a conveyor for supporting bars to be welded, means for supplying a welding current to said bars, and means for utilizing a portion of said current to limit the flow of said currents and to assist in holding the bars in position upon the conveyor.

10. Electric welding apparatus comprising a conveyor for supporting bars to be welded, means for supplying a welding current to said bars, and means for utilizing a portion of said current to limit the flow of said currents and to assist in holding the bars in position upon the conveyor, said means comprising magnetizable members disposed at opposite sides of said bar to form a magnetic flux path around said bars upon passage of current through the bars.

11. Electric welding apparatus comprising a plurality of pairs of electrodes, transformers for said electrodes, means for making and breaking the circuits of the transformers at predetermined intervals, other means for supplying current through the primary windings of the transformers at intervals of time different from the said first-named intervals, means for supplying current to the primary windings of some of said transformers in one timed relation with respect to the completing of the circuits at other points through the transformer windings, and means for supply current to others of said primary windings in a different timed relation.

12. Electric welding apparatus comprising a carrier for the material to be welded, electrodes on said carrier disposed to one side of said material, a cooperating electrode for engaging the other side of said material, means for supplying current to said electrodes, and means controlled by the current supply for applying pressure to said last-named electrode.

13. Electric welding apparatus comprising a carrier for the material to be welded, electrodes on said carrier for engaging one side of said material, a cooperating electrode engaging the other side of the material and movable relatively to the carrier, means controlled by movement of the carrier for effecting a flow of welding current through said electrodes when in welding position, and means controlled by movement of the carrier for applying welding pressure to said electrodes.

14. Electric welding apparatus comprising a movable electrode, a welding circuit, a control circuit, means actuated by movement of said electrode for closing the welding circuit, means operable upon closure of the welding circuit for closing the control circuit, and means operable upon closure of the control circuit for interrupting the welding circuit.

15. Electric welding apparatus comprising a conveyor for supporting bars to be welded, means for supplying welding current to said bars, and magnetic means for limiting the flow of stray current past predetermined points on said bars, and for holding the bars in position upon the conveyor.

16. Electric welding apparatus comprising a conveyor for supporting bars to be welded, means for supplying a welding current to said bars, and magnetic means for holding the bars in position upon said conveyor.

17. In electric welding apparatus, the combination with a roller electrode and a contact roller, mounted upon a common support, of a yielding mounting for said contact roller permitting movement thereof independently of said electrode.

18. In electric welding apparatus, the combination with a roller electrode, of a return conductor for completing the circuit through said electrode, a common support for said conductor and said electrode, and means for permitting yielding movement of said conductor independently of the movement of said electrode.

19. Electric welding apparatus comprising a plurality of sets of relatively movable electrodes, a welding circuit, the electrodes of one set being mounted independently of one another, means for applying welding pressure to the last named electrodes independently of one another, and means for supplying current thereto individually.

20. Electric welding apparatus comprising a plurality of electrodes, means for reducing magnetic reluctance to current flow between some of said electrodes, and means for increasing magnetic reluctance between others of said electrodes.

21. Electric welding apparatus comprising a carrier for material to be welded, electrodes on said carrier for engaging one side of the material, a cooperating electrode engaging the other side of the material, a welding circuit controlled by movement of the carrier, an auxiliary circuit energized upon closure of the welding circuit, and a pressure device controlled by said auxiliary circuit, for exerting welding pressure on one of said electrodes.

22. Electric welding apparatus comprising a carrier for material to be welded, electrodes on said carrier for engaging one side of the material, a cooperating electrode engaging the other side of the material, a welding circuit controlled by movement of the carrier, an auxiliary circuit energized upon closure of the welding circuit, and a pressure device controlled by said auxiliary circuit, for exerting welding pressure on one of said electrodes, the auxiliary circuit being closed in predetermined relation to the movement of the carrier.

23. Electric welding apparatus comprising co-operating electrodes, means for pivotally supporting one of said electrodes for movement with relation to the other electrode, a carrier for the material to be welded, a welding circuit, a switch in said circuit controlled by pivotal movements of the movable electrode, and means operating in predetermined relation to the movement of the carrier, for moving the last named electrode to actuate said switch.

24. Electrical welding apparatus comprising co-operating electrodes; one of which is movable with respect to the other; a carrier for one of the electrodes and for the material to be welded, a welding circuit, a control circuit, means actuated by movement of one of the electrodes for closing one of said circuits and for effecting closure of the other circuit upon the closure of the said one circuit, and a time element device in the control circuit for breaking the welding circuit.

25. Electrical welding apparatus comprising co-operating electrodes; one of which is movable with respect to the other; a carrier for one of the electrodes and for the material to be welded, a welding circuit, a control circuit, means actuated by movement of said carrier for closing one of said circuits and for effecting closure of the other circuit upon the closure of the said one circuit, and a time element device in the control circuit for breaking the welding circuit.

26. Electrical welding apparatus comprising co-operating electrodes, one of which is movable with respect to the other, a carrier for one of the electrodes and for the material to be welded, a welding circuit, a control circuit, means actuated by movement of said carrier for closing one of said circuits and for effecting closure of the other circuit upon the closure of the said one circuit, a time element device in the control circuit for breaking the welding circuit, and means for restoring the initial condition of said circuits upon further movement of the carrier.

In testimony whereof I, the said WILLIAM EDGAR REED, have hereunto set my hand.

WILLIAM EDGAR REED.